(12) United States Patent
Yoon

(10) Patent No.: US 8,216,713 B2
(45) Date of Patent: Jul. 10, 2012

(54) BATTERY HOUSING FORMED WITH COOLING PASSAGES AND BATTERY PACK HAVING THE SAME

(75) Inventor: Jihyoung Yoon, Suwon-si (KR)

(73) Assignee: SB Limotive Co., Ltd., Yongin-si (KR)

( * ) Notice: Subject to any disclaimer, the term of this patent is extended or adjusted under 35 U.S.C. 154(b) by 0 days.

(21) Appl. No.: 12/496,607

(22) Filed: Jul. 1, 2009

(65) Prior Publication Data

US 2010/0216004 A1 Aug. 26, 2010

Related U.S. Application Data

(60) Provisional application No. 61/155,422, filed on Feb. 25, 2009.

(51) Int. Cl.
*H01M 2/00* (2006.01)
(52) U.S. Cl. ........... 429/148; 429/149; 429/156; 429/71
(58) Field of Classification Search .................... 429/71, 429/148, 149, 156
See application file for complete search history.

(56) References Cited

U.S. PATENT DOCUMENTS

| | | | |
|---|---|---|---|
| 5,985,483 A | 11/1999 | Verhoog et al. | |
| 6,482,542 B1 | 11/2002 | Takaki et al. | |
| 6,818,343 B1 | 11/2004 | Kimoto et al. | |
| 7,332,244 B2 * | 2/2008 | Uemoto et al. | 429/185 |
| 2003/0064283 A1 | 4/2003 | Uemoto et al. | |
| 2003/0118898 A1 | 6/2003 | Kimura et al. | |
| 2004/0201366 A1 * | 10/2004 | Kimoto et al. | 320/150 |
| 2006/0063067 A1 * | 3/2006 | Kim | 429/148 |
| 2006/0105238 A1 * | 5/2006 | Woo | 429/180 |

FOREIGN PATENT DOCUMENTS

| | | |
|---|---|---|
| EP | 0 933 830 A1 | 8/1999 |
| EP | 1 093 170 A1 | 4/2001 |
| JP | 2000-164186 | 6/2000 |
| JP | 2000-251953 | 9/2000 |
| JP | 2003-109655 | 4/2003 |
| JP | 2005-166374 | 6/2005 |
| KR | 10-2006-0026601 | 3/2006 |
| KR | 10-2006-00378 33 | 5/2006 |

OTHER PUBLICATIONS

European Search Report dated Dec. 23, 2009, for corresponding European Patent application 09171611.8, noting listed references in this IDS.
Patent Abstracts of Japan and English machine translation of Japanese Publication 2005-166374 listed above, 18 pages.
KIPO Office Action dated Oct. 18, 2011, for corresponding Korean Patent Application No. 10-2009-0115133.
KIPO Notice of Allowance dated Dec. 30, 2011, for corresponding Korean Patent Application No. 10-2009-0115133.

* cited by examiner

*Primary Examiner* — Barbara Gilliam
*Assistant Examiner* — Zachary Best
(74) *Attorney, Agent, or Firm* — Christie, Parker & Hale, LLP

(57) ABSTRACT

A battery pack includes a housing having at least one coupling recess, a peripheral portion around the at least one coupling recess, and a plurality of cooling passages extending in at least one direction of the at least one coupling recess and within the peripheral portion, and a battery cell housed in the at least one coupling recess.

17 Claims, 15 Drawing Sheets

US 8,216,713 B2

BATTERY HOUSING FORMED WITH COOLING PASSAGES AND BATTERY PACK HAVING THE SAME

CROSS-REFERENCE TO RELATED APPLICATION

This application claims priority to and the benefit of U.S. Provisional Patent Application No. 61/155,422, filed Feb. 25, 2009, the entire content of which is incorporated herein by reference.

BACKGROUND OF THE INVENTION

1. Field of the Invention

Aspects of the present invention relate to a battery housing for a battery pack and a battery pack including the housing.

2. Description of the Related Art

Generally, a battery pack is mounted as a power supply system on a hybrid vehicle or an electric vehicle that can be driven by the interaction of an engine with an electric motor.

SUMMARY OF THE INVENTION

An embodiment of the present invention provides a battery pack including a housing having at least one coupling recess, a peripheral portion around the at least one coupling recess, and a plurality of cooling passages extending in at least one direction of the at least one coupling recess and within the peripheral portion, and a battery cell housed in the at least one coupling recess.

In one embodiment, the housing has a top surface and a bottom surface and wherein the at least one direction is a direction normal to the top surface and to the bottom surface. Further, in one embodiment, the plurality of cooling passages extend from the top surface to the bottom surface.

In one embodiment, the battery pack further includes a heat screen on the housing, the heat screen having a substantially planar surface covering a first array of the plurality of cooling passages, a first opening exposing the at least one coupling recess, and a plurality of second openings each exposing a second array of the plurality of cooling passages. In one embodiment, the plurality of second openings surround the first opening.

In another exemplary embodiment, a battery pack is provided including a battery assembly having an electrode assembly; a current collector plate electrically coupled to the electrode assembly; and a cap plate on the electrode assembly. The battery pack also includes a housing having at least one coupling recess housing the battery assembly and an electrolyte, a peripheral portion around the at least one coupling recess, and a plurality of cooling passages extending in at least one direction of the at least one coupling recess and within the peripheral portion.

In one embodiment, an area of the cap plate is not less than an area of an opening of the at least one coupling recess and the cap plate is welded to the housing. Further, in one embodiment, an insulating layer is on inner walls of the housing defining the coupling recess. Additionally, the plurality of cooling passages may be grouped at a first pitch and groups of the plurality of cooling passages may be spaced from each other by a second pitch greater than the first pitch or the plurality of cooling passages are evenly spaced from each other.

In another embodiment, a battery pack is provided including a plurality of battery assemblies, each of the battery assemblies including an electrode assembly; a current collector plate electrically coupled to the electrode assembly; and a cap plate on the electrode assembly; and a plurality of coupling recesses, each of the plurality of coupling recesses housing a corresponding one of the plurality of battery assemblies and an electrolyte.

In one embodiment, the housing further includes a peripheral portion and a plurality of cooling passages extending in at least one direction of the plurality of coupling recesses and within the peripheral portion.

Additional aspects of the invention will be set forth in part in the description which follows.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
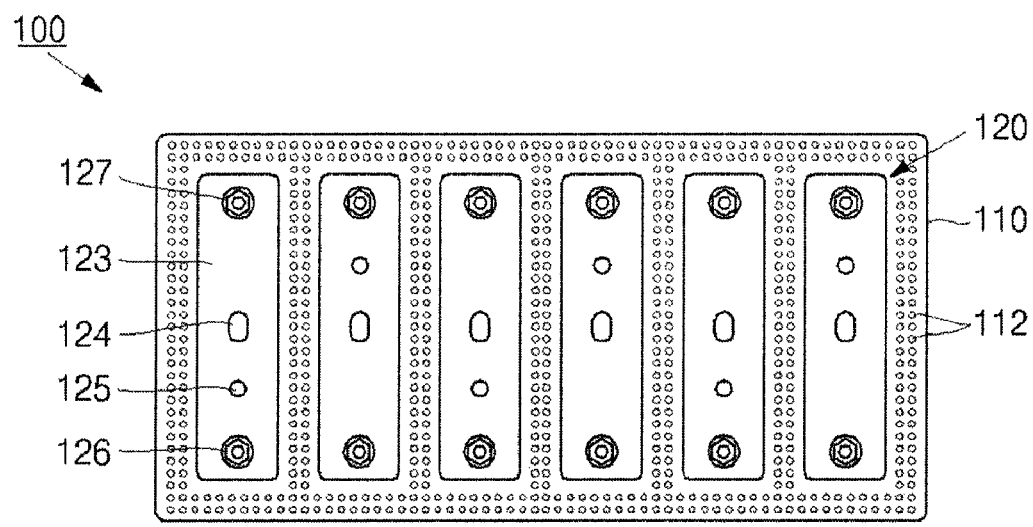
FIGS. 1a, 1b, 1c and 1d are a plan schematic view, a bottom schematic view, a schematic assembled perspective view and a partially exploded perspective view, respectively, of a battery pack according to one embodiment of the present invention.
Figure 1B:
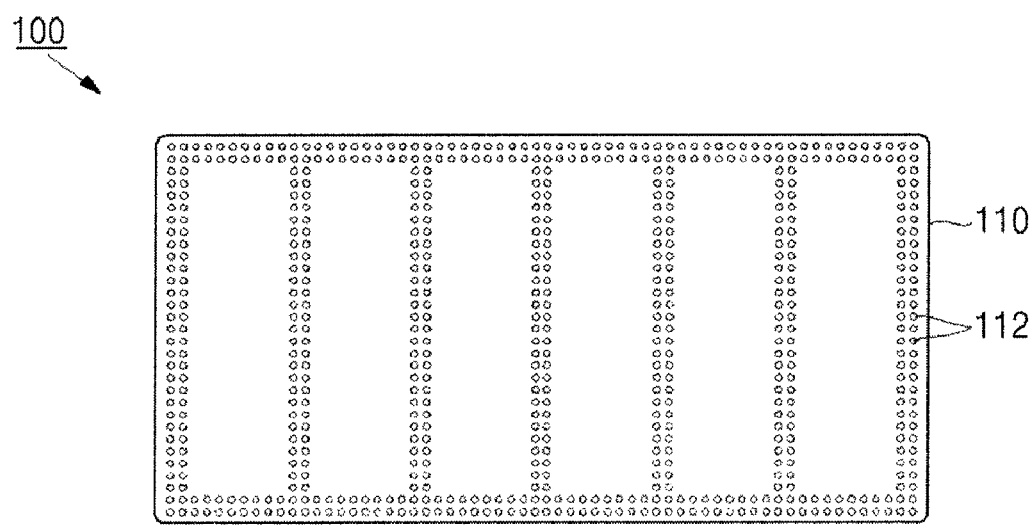
Figure 1C:
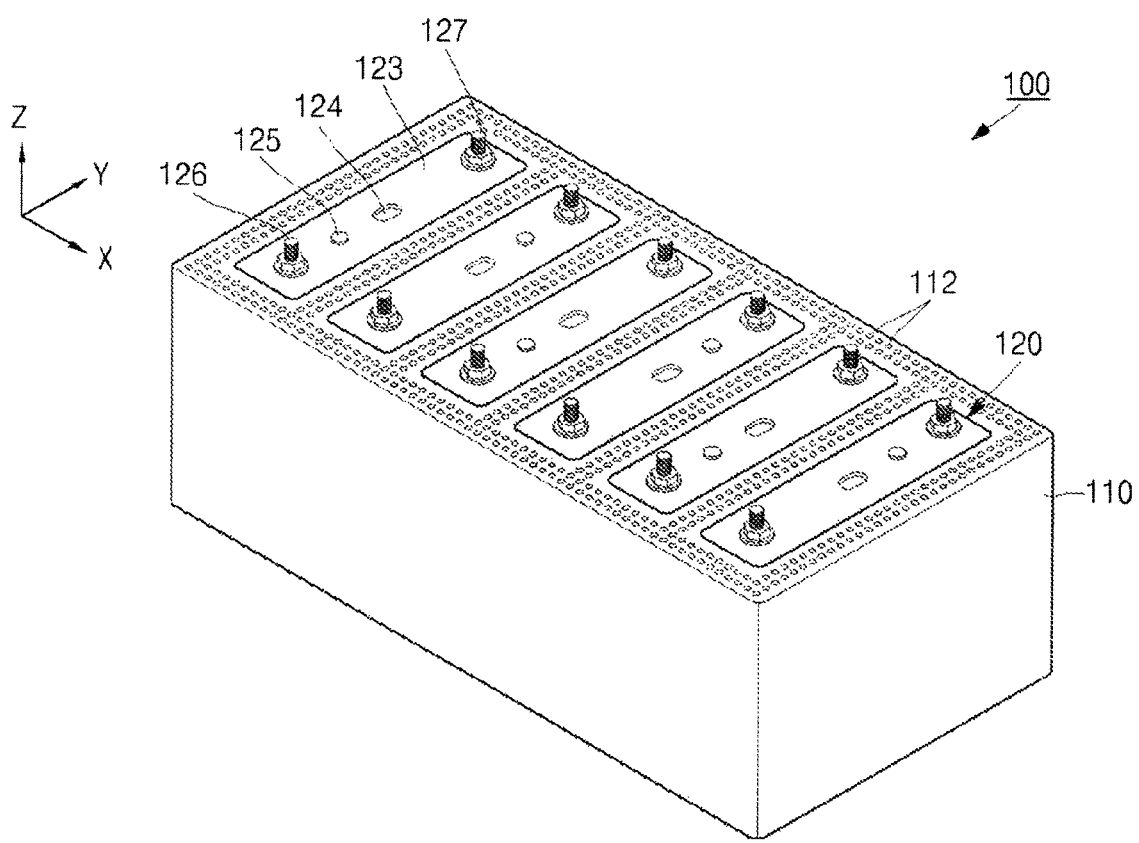
Figure 1D:
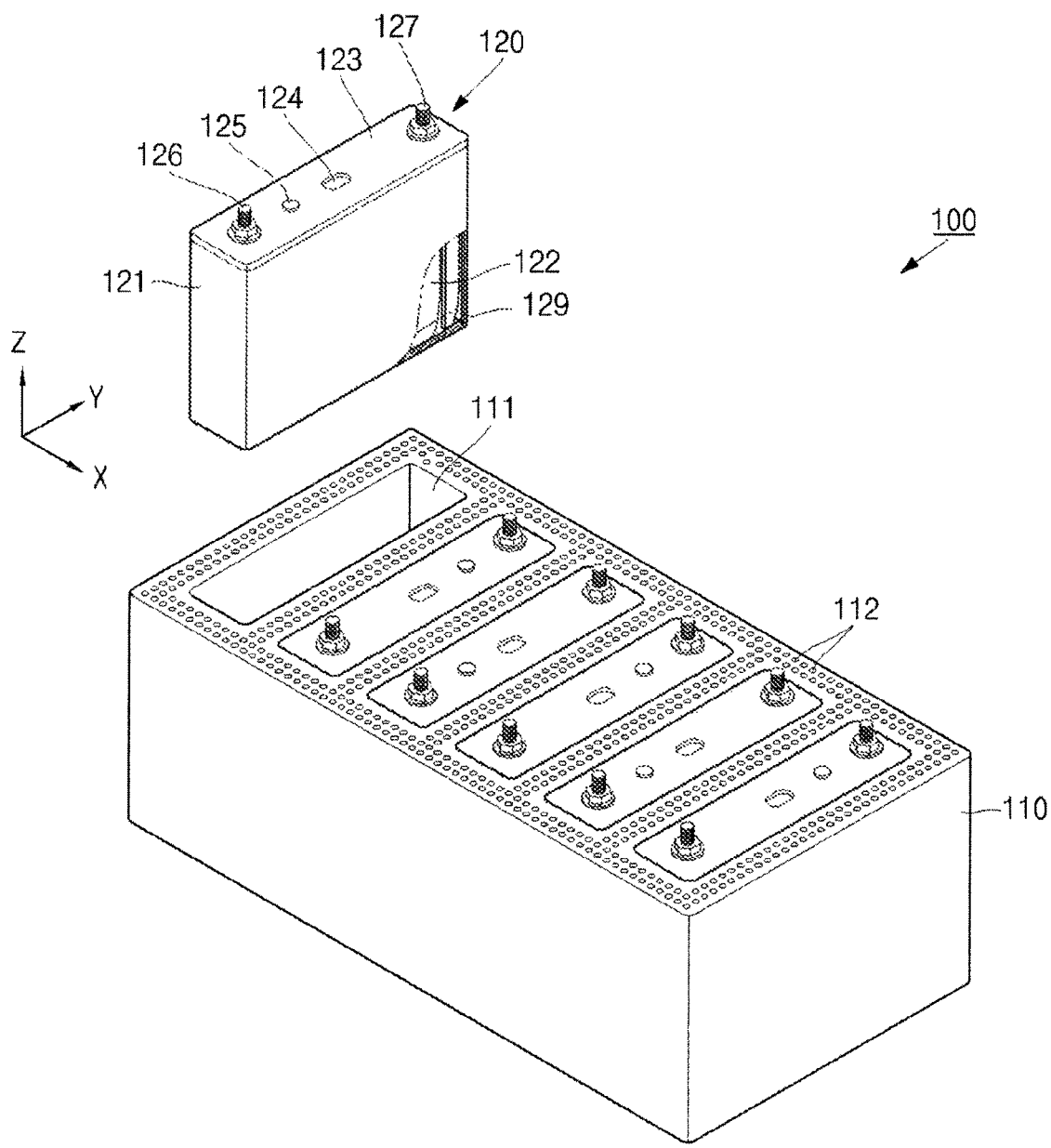

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIGS. 1a through 1d are a schematic plan view, a schematic bottom view, a schematic assembled perspective view and a partially exploded perspective view, respectively, of a battery pack 100 according to one embodiment of the present invention.

As illustrated in FIGS. 1a through 1d, the battery pack 100 includes a battery housing 110 and battery cells 120.

The battery housing 110 has a plurality of coupling recesses 111 (FIG. 1d) formed at a set (or predetermined) depth and a plurality of cooling passages 112 formed around the circumferences of the coupling recesses 111. That is, the plurality of cooling passages extend in at least one direction of the coupling recesses and within a peripheral portion around the cooling recesses. The coupling recesses 111 may be arranged at regular intervals in a horizontal direction of the battery housing 110. The coupling recesses 111 have a sufficient depth such that a battery cell 120 can be coupled and stably fixed thereto. There is no restriction on the longitudinal plan or cross-sectional shape of the coupling recesses 111. For example, each of the coupling recesses 111 may be rectangular, square or circular when view along a longitudinal cross-section. The cooling passages 112 may be arranged at the same pitch or different pitches (i.e., spaced equally from each other or spaced at varying distances from each other) around the circumferences of the coupling recesses 111. The coupling recesses 111 may have a depth less than the height of the battery housing 110, while the cooling passages 112 may be formed so as to completely penetrate the battery housing 110 in the vertical direction. This structure allows a cooling gas or fluid to flow freely through the cooling passages 112 from the top to the bottom or vice versa to markedly improve the cooling performance of the battery pack 100.

The battery housing 110 may be made of a material selected from, but not limited to, aluminum (Al), copper (Cu), iron (Fe), SUS steel, ceramics, polymers and equivalents thereof. Examples of the ceramics include silicon nitride ($Si_3N_4$), silicon carbide (SiC), SiAlON, alumina ($Al_2O_3$) and zirconia ($ZrO_2$), but are not limited thereto. Examples of the polymers include polypropylene (PP), polyethylene (PE), polybutylene terephthalate (PBT) and perfluoroalkoxy (PFA), but are not limited thereto. Any common technique may be used to form the coupling recesses 111 and the cooling passages 112, and specific examples thereof include, but are not limited to, drawing, extrusion, laser etching and chemical etching.

Each of the battery cells 120 includes a case 121, an electrode assembly 122, a cap plate 123, a positive terminal 126 and a negative terminal 127.

The case 121 is coupled to the corresponding coupling recess 111 of the battery housing 110. The case 121 may be made of a material selected from aluminum (Al), copper (Cu), iron (Fe), SUS steel, ceramics, polymers and equivalents thereof. However, there is no restriction on the material for the case 121. The case 121 may be rectangular, square or circular along a longitudinal plan or cross-section. However, there is no restriction on the longitudinal plan or cross-sectional shape of the case 121.

The electrode assembly 122 is accommodated together with an electrolyte in the case 121. The electrode assembly 122 may be composed of a positive electrode plate, a separator and a negative electrode plate. In one embodiment, the electrode assembly 122 is produced by rolling the positive electrode plate, the separator and the negative electrode plate about a roll axis several times to form a substantially elliptical (or jelly roll) shape.

The cap plate 123 is coupled to the case 121 to cover the electrode assembly 122. The coupling of the cap plate 123 to the case 121 may be accomplished by laser welding, resistance welding and/or ultrasonic welding. The case 121 and the cap plate 123 may be made of the same or different materials. The cap plate 123 may be provided with a safety vent 124 that ruptures to release the internal gas of the case 121 when the internal pressure of the case 121 exceeds an allowable value. The thickness of the safety vent 124 may be smaller than that of the cap plate 123. A plug 125 may be further coupled to the cap plate 123 to close an injection hole after the electrolyte is injected into the case 121.

The positive terminal 126 and the negative terminal 127 are coupled to the cap plate 123 and protrude a set (or predetermined) distance upward from the cap plate 123. Each of the positive terminal 126 and the negative terminal 127 may have a threaded outer surface to which a bus bar is fixedly coupled in a subsequent step. The positive terminal 126 may be electrically connected to the positive electrode plate of the electrode assembly 122 via a current collector plate, and the negative terminal 127 may be electrically connected to the negative electrode plate of the electrode assembly 122 via a current collector plate 129. The positive terminal 126 and the negative terminal 127 may be made of aluminum (Al) and copper (Cu), respectively, but the present invention is not limited to these materials.

The height of the battery cells 120, each of which includes the case 121 and the cap plate 123, may be substantially the same as the depth of the coupling recesses 111 formed in the battery housing 110. With these dimensions, the surface of the cap plate 123 may lie in substantially the same plane as the upper surface of the battery housing 110 when the battery cell 120 is coupled to the corresponding coupling recess 111 of the battery housing 110. It should, of course, be understood that the height of the battery cells 120 may be greater or less than the depth of the coupling recesses 111.

In this embodiment, the cooling passages 112 formed in the battery housing 110 markedly improve the cooling efficiency of the battery pack 110 to reduce or minimize the degradation of the battery pack 110. In addition, the formation of the cooling passages 112 contributes to an improvement in the strength of the battery housing 110 and a reduction in the weight of the battery housing 110 without additional parts or any increase in thickness. That is, in one embodiment, a honeycomb-like structure of the cooling passages 112 leads to a reduction in the weight of the battery housing 110 while improving the strength of the battery housing 110. Accordingly, the battery cells 120 of the battery pack 100 are properly protected or prevented from swelling.

Figure 2A:
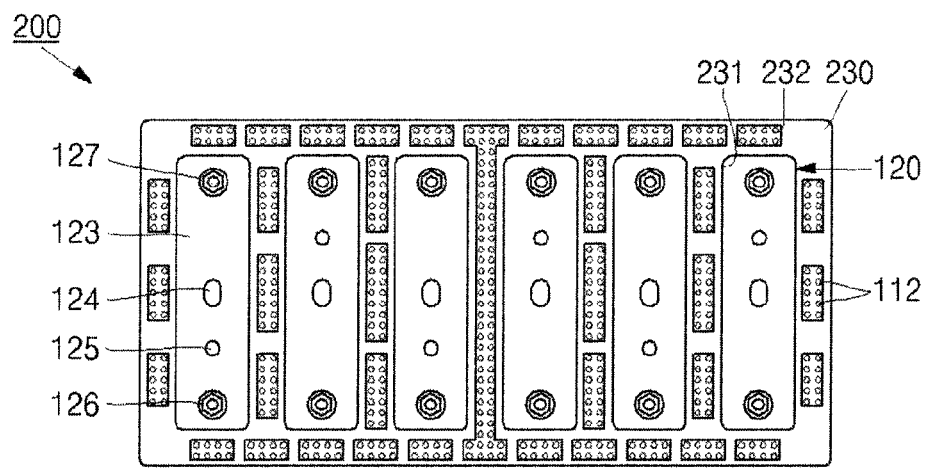
FIGS. 2a, 2b and 2c are a schematic plan view, a schematic assembled perspective view and a partially exploded perspective view, respectively, of a battery pack according to another embodiment of the present invention.
Figure 2B:
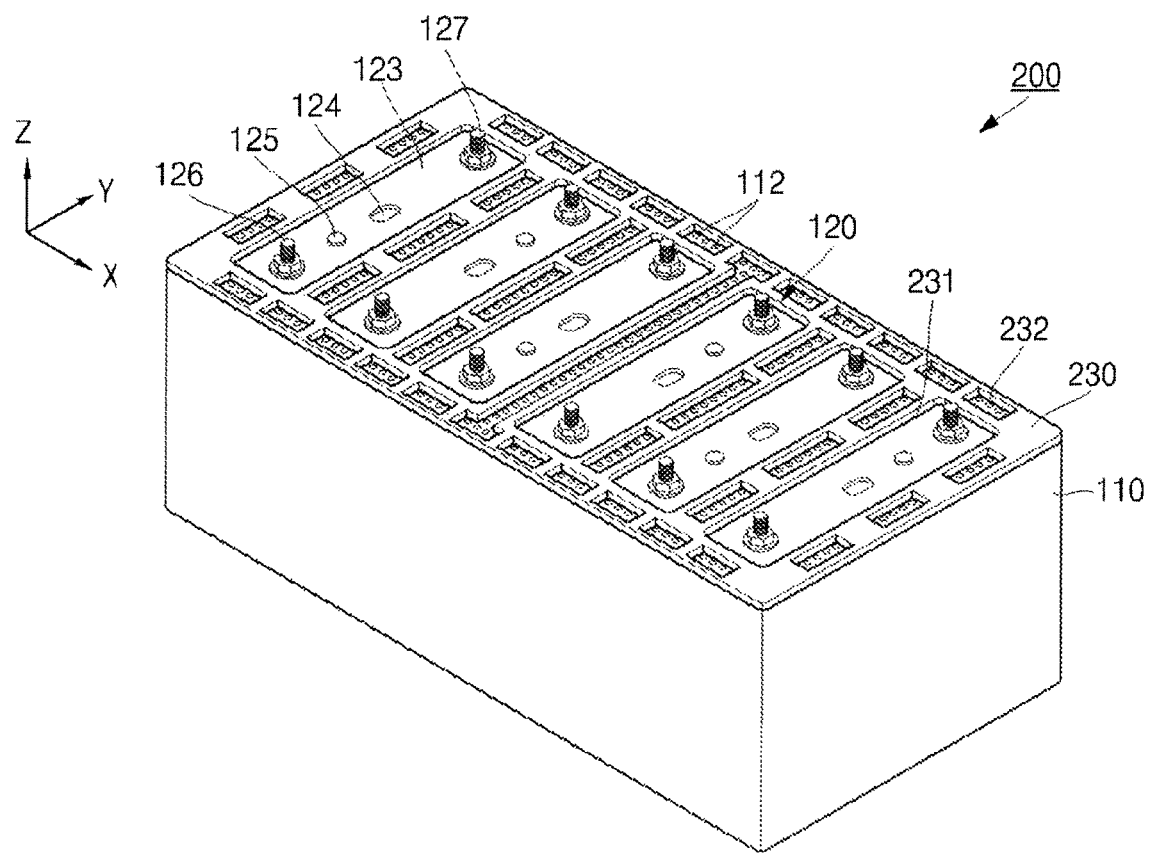
Figure 2C:
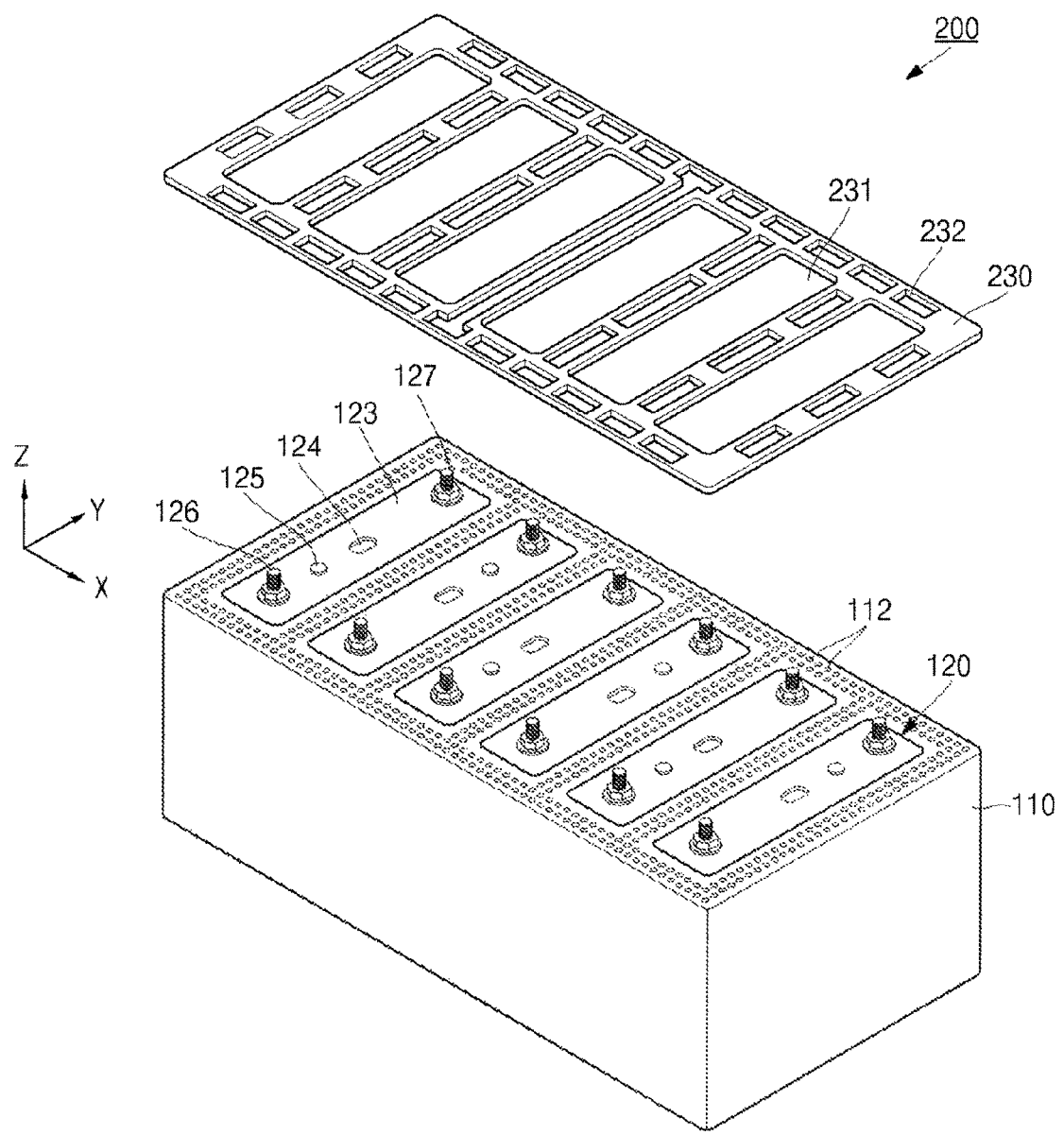

FIGS. 2a through 2c are a schematic plan view, a schematic assembled perspective view and a partially exploded perspective view, respectively, of a battery pack 200 according to another embodiment of the present invention.

As illustrated in FIGS. 2a through 2c, the battery pack 200 includes a battery housing 110, battery cells 120 and a heat-screening member 230. The battery housing 110 and the battery cells 120 are the same (or substantially the same) as those described in the previous embodiment. Hereinafter, the heat-screening member 230 will be primarily explained.

The heat-screening member 230 is substantially in the form of a thin plate and acts to open or close selected cooling passages 112 formed in the battery housing 110. During charging or discharging of the battery pack 200, the battery cell 120 positioned corresponding to the center of the battery pack 200 generally has the highest temperature and the battery cells 120 positioned corresponding to both edges of the battery pack 200 generally have the lowest temperatures. Thus, the heat-screening member 230 is designed such that a relatively large number of the cooling passages 112 in the central region of the battery housing can be opened and a relatively small number of the cooling passages 112 in the edge regions of the battery housing can be closed.

In one embodiment, the heat-screening member 230 has first openings 231 formed in positions of the battery housing 110 corresponding to the battery cells 120 and second openings 232 around the first openings 231 to open the selected cooling passages 112. More specifically, the second openings 232 in positions of the heat-screening member 230 corresponding to the cooling passages 112 in the central region of the battery housing 110 are relatively larger in size and the second openings 232 in positions of the heat-screening member 230 corresponding to the cooling passages 112 in the edge or peripheral regions of the battery housing 110 are relatively smaller in size.

The heat-screening member 230 may be made of a material selected from, but not limited to, metals, ceramics, polymers and equivalents thereof. The heat-screening member 230 may be coupled to the battery housing 110 by adhesion or welding, but not limited thereto and may be coupled by another other suitable coupling method.

In this embodiment, the size and arrangement of the second openings 232 of the heat-screening member 230 in the battery pack 200 can be properly designed to maintain the temperatures of all battery cells 120 stacked in a horizontal direction of the battery housing 110 at substantially the same level during charge or discharge. As a result, the charge and discharge capacities of the battery cells 120 are kept substantially constant, leading to a further improvement in the electrical performance of the battery pack 200.

Figure 3A:
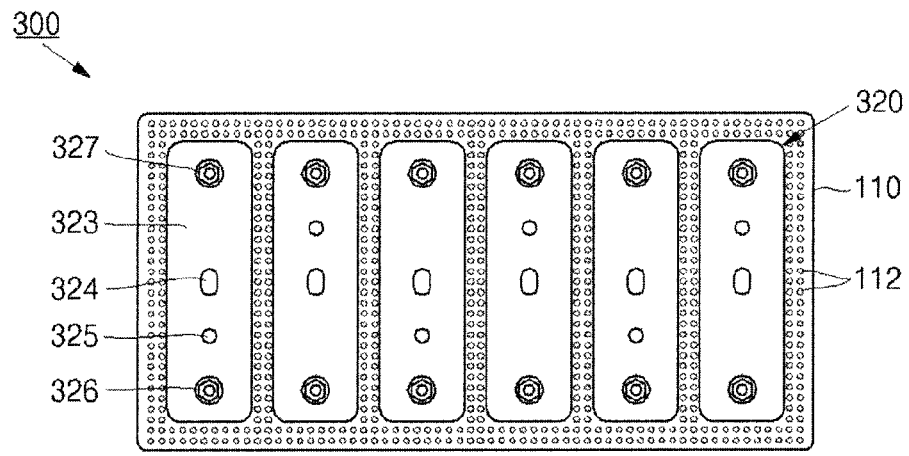
FIGS. 3a, 3b and 3c are a schematic plan view, a schematic assembled perspective view and a partially exploded perspective view, respectively, of a battery pack according to another embodiment of the present invention.
Figure 3B:
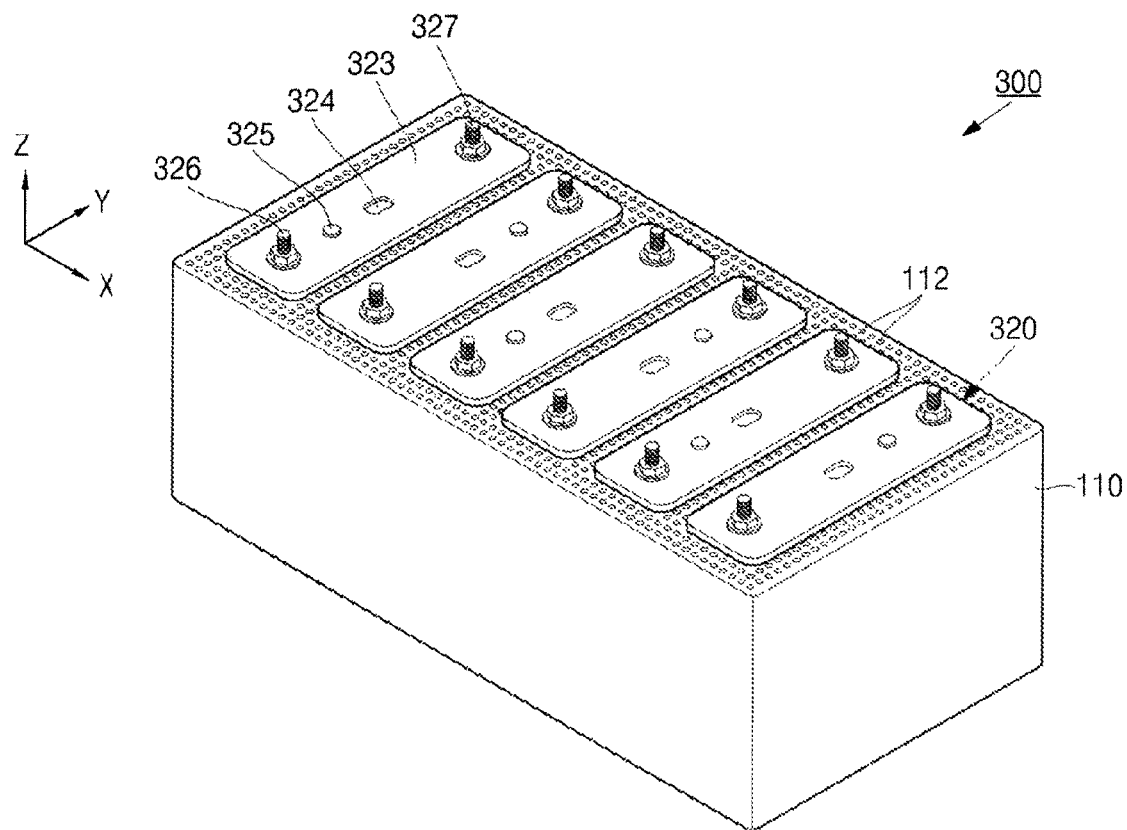
Figure 3C:
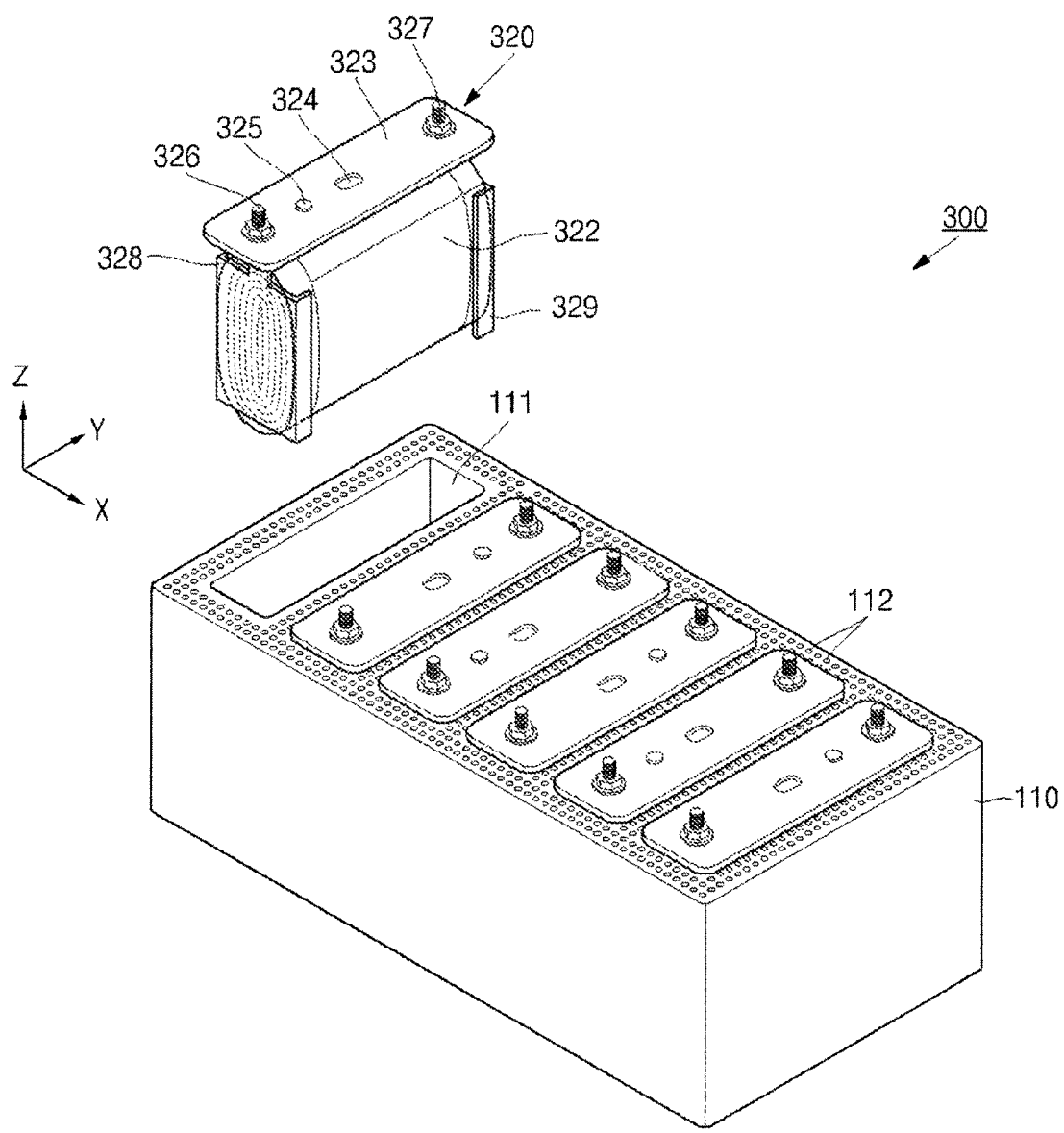

FIGS. 3a through 3c are a schematic plan view, a schematic assembled perspective view and a partially exploded perspective view, respectively, of a battery pack 300 according to another embodiment of the present invention.

As illustrated in FIGS. 3a through 3c, the battery pack 300 includes a battery housing 110 and battery cells 320. The battery housing 110 is the same (or substantially the same) as that described in the previous embodiments. Hereinafter, the battery cells 320 will be primarily explained.

Each of the battery cells 320 includes an electrode assembly 322, a cap plate 323, a positive terminal 326 and a negative terminal 327.

The battery housing 110 has coupling recesses 111, each of which accommodates the electrode assembly 322 and an electrolyte therein. The electrode assembly 322 may include a positive electrode plate, a separator and a negative electrode plate. The positive electrode plate, the separator and the negative electrode plate are rolled about an axis several times.

The cap plate 323 is directly coupled to the battery housing 110 to cover the electrode assembly 322. The coupling of the cap plate 323 to the battery housing 110 may be accomplished by resistance welding, laser welding or ultrasonic welding. The cap plate 323 and the battery housing 110 may be made of the same or different materials. The cap plate 323 may be provided with a safety vent 324 that ruptures to release the internal gas of the battery cell 320 when the internal pressure of the corresponding coupling recess 111 exceeds the allowable value. The thickness of the safety vent 324 may be smaller than that of the cap plate 323. A plug 325 may be further coupled to the cap plate 323 to close an injection hole after the electrolyte is injected into the corresponding coupling recess 111.

The positive terminal 326 and the negative terminal 327 are coupled to the cap plate 323 and protrude a set (or predetermined distance upward from the cap plate 323. The positive terminal 326 may be electrically connected to the positive electrode plate of the electrode assembly 322 via a current collector plate 328, and the negative terminal 327 may be electrically connected to the negative electrode plate of the electrode assembly 322 via a current collector plate 329.

The cap plate 323 may have a width larger than a width of a corresponding coupling recess 111 of the battery housing 110 in order for the cap plate 323 to be coupled to the battery housing 110 directly. With these dimensions, the cap plate 323 is formed to a set or predetermined thickness on the upper surface of the battery housing 110. It should be noted that the designs of the coupling recesses 111 and the cap plates 323 may be slightly varied to allow the cap plates 323 to lie in substantially the same plane as the battery housing 110.

In this embodiment, no case is used in each of the battery cells 320, contributing to a reduction in the manufacturing cost of the final battery pack 300. As described above, the use of a plurality of cooling passages 112 in the battery housing 110 contributes to improvements in the cooling performance and strength of the battery housing 110, thus eventually preventing (or protecting from) deterioration of the battery cells 320 while inhibiting swelling of the battery cells 320.

Figure 4A:
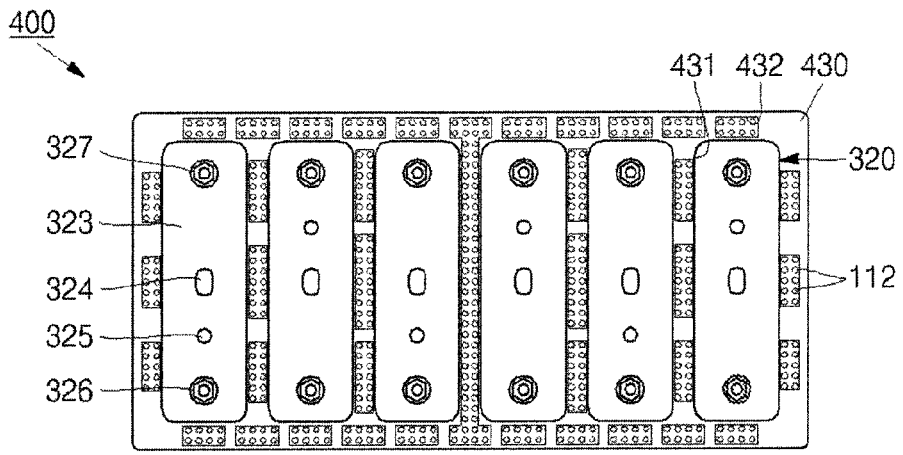
FIGS. 4a, 4b and 4c are a plan view, an assembled perspective view and a partially exploded perspective view, respectively, of a battery pack according to another embodiment of the present invention.
Figure 4B:
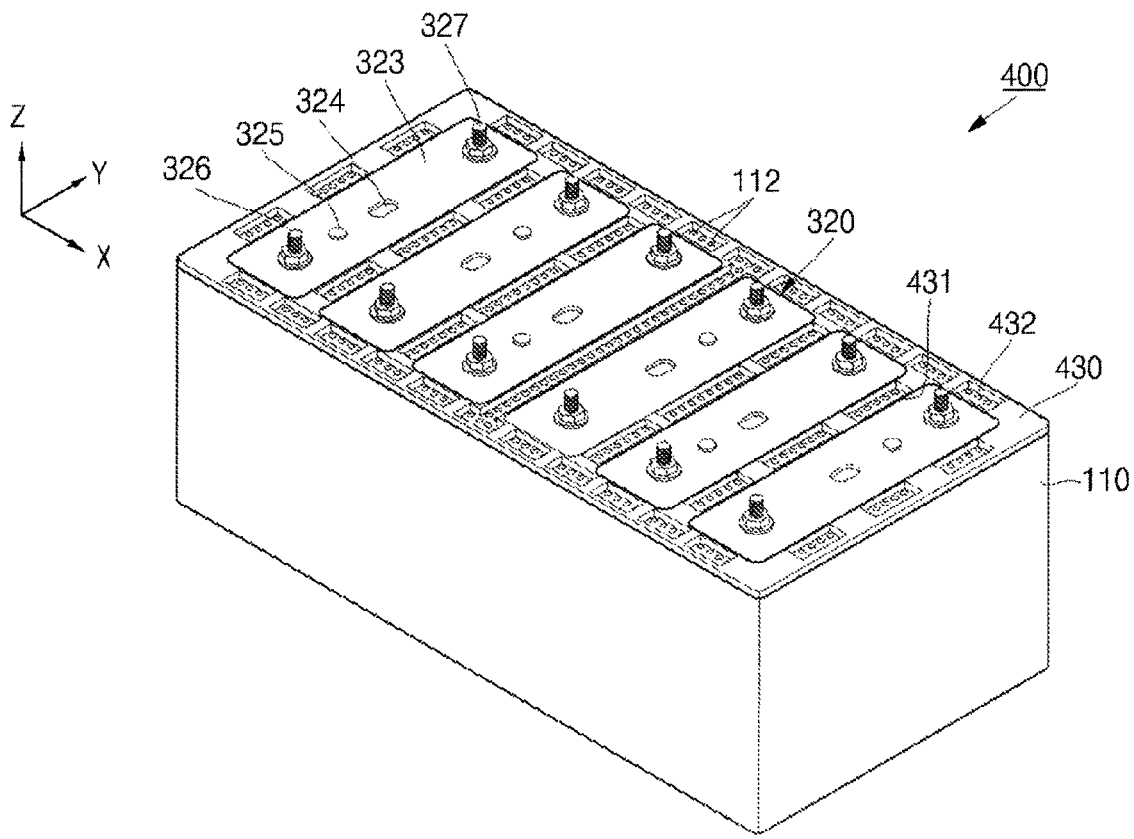
Figure 4C:
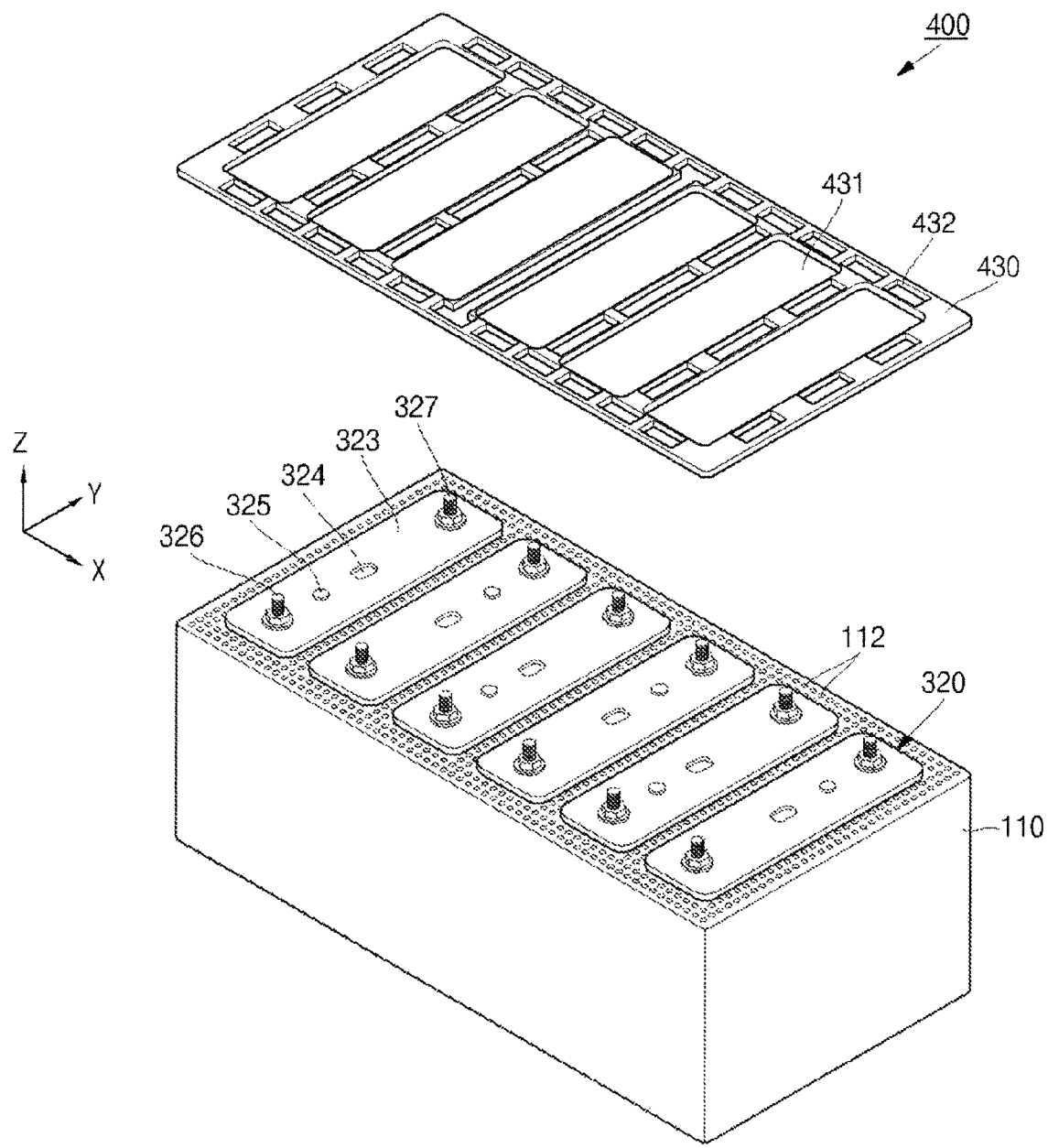

FIGS. 4a through 4c are a schematic plan view, a schematic assembled perspective view and a partially exploded perspective view, respectively, of a battery pack 400 according to another embodiment of the present invention.

As illustrated in FIGS. 4a through 4c, the battery pack 400 includes a battery housing 110, battery cells 320 and a heat-screening member 430. The battery housing 110 and the battery cells 320 are the same (or substantially the same) as those described in the previous embodiment. Actually, the heat-screening member 430 is also similar to the heat-screening member 230 of the battery pack 200.

The heat-screening member 430 has first openings 431 formed in positions of the battery housing 110 corresponding to the battery cells 320 and second openings 432 formed around the first openings 431 to open selected cooling passages 112 of the battery housing 110. The second openings 432 in positions of the heat-screening member 430 corresponding to the cooling passages 112 in the central region of the battery housing 110 are relatively larger in size and the second openings 432 of the heat-screening member 430 in positions corresponding to the cooling passages 112 in the edge regions of the battery housing 110 are relatively smaller in size. That is, the heat screening member 430 has a substantially planar surface covering a first array of the plurality of cooling passages, a first opening exposing the at least one coupling recess, and a plurality of second openings each exposing a second array of the plurality of cooling passages. In one embodiment, as shown in FIG. 4a, the peripheral portion comprises a first peripheral portion and a second peripheral portion, wherein the heat screening member 430 exposes a larger number of the plurality of cooling passages in the first peripheral portion than in the second peripheral portion.

The cap plates 323 of the battery cells 320 protrude from the surface of the battery housing 110. The cap plates 323 may lie in substantially the same plane as the heat-screening member 430 when the thickness of the cap plates 323 is substantially equal to a thickness of the heat-screening member 430. That is, the cap plates 323 may be flush with the heat-screening member 430.

In this embodiment, the temperatures of all battery cells 320 stacked in a horizontal direction of the battery housing 110 can be maintained at substantially the same level during charge or discharge. As a result, the charge and discharge capacities of the battery cells 320 are kept relatively constant, leading to an improvement in the electrical performance of the battery pack 400.

FIGS. 5a through 5e are schematic plan views illustrating various shapes of cooling passages formed in a battery housing according to embodiments of the present invention.

Figure 5A:
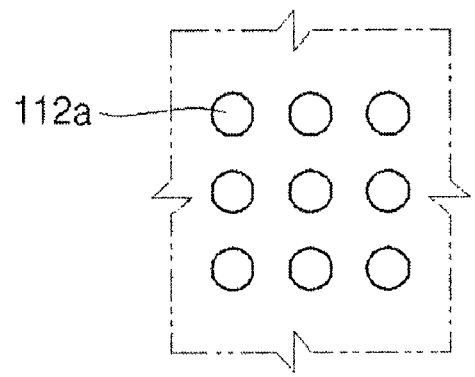
FIGS. 5a, 5b, 5c, 5d and 5e are schematic plan views illustrating various shapes of cooling passages formed in a battery housing according to embodiments of the present invention.
Figure 5B:
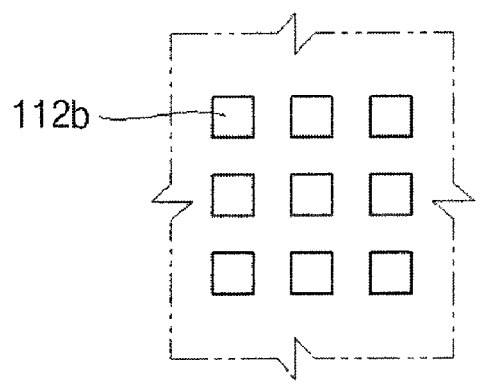
Figure 5C:
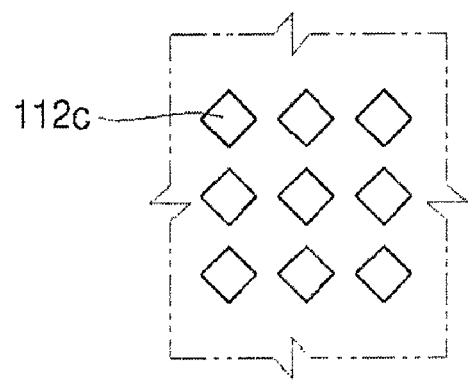
Figure 5D:
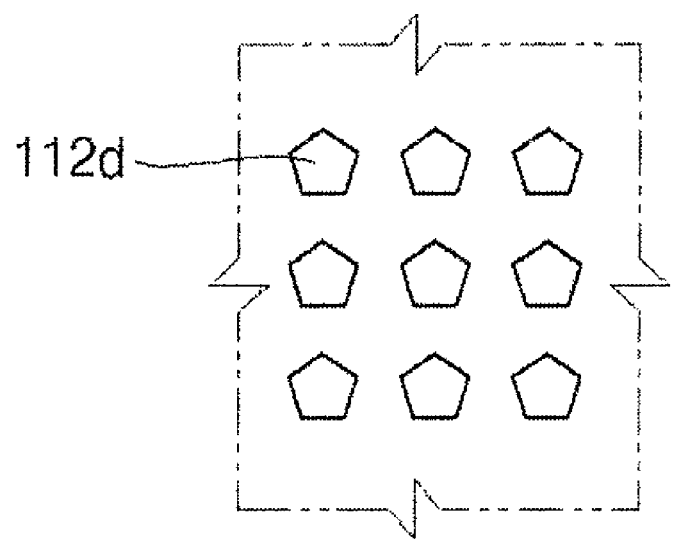
Figure 5E:
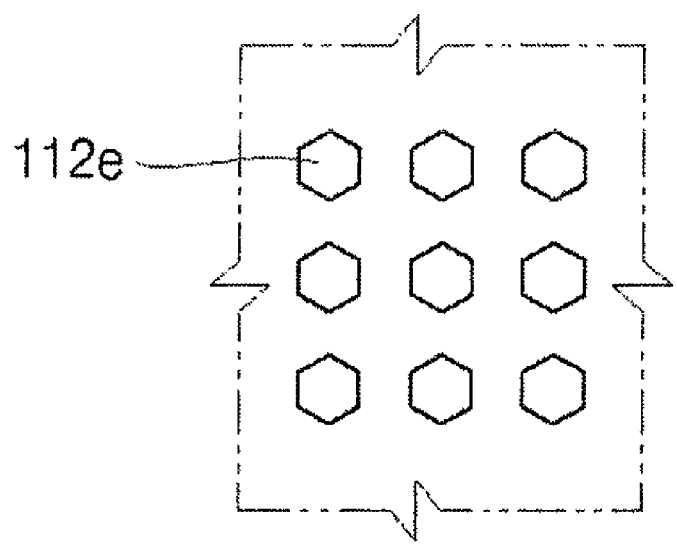

FIG. 5a illustrates cooling passages 112a having a substantially circular longitudinal cross-sectional shape, FIG. 5b illustrates cooling passages 112b having a substantially quadrangular longitudinal cross-sectional shape, FIG. 5c illustrates cooling passages 112c having a substantially lozenge or diamond longitudinal cross-sectional shape, FIG. 5d illustrates cooling passages 112d having a substantially pentagonal longitudinal cross-sectional shape, and FIG. 5e illustrates cooling passages 112e having a substantially hexagonal longitudinal cross-sectional shape. The shapes of the cooling passages are merely illustrative and the present invention is not limited thereto.

Figure 6A:
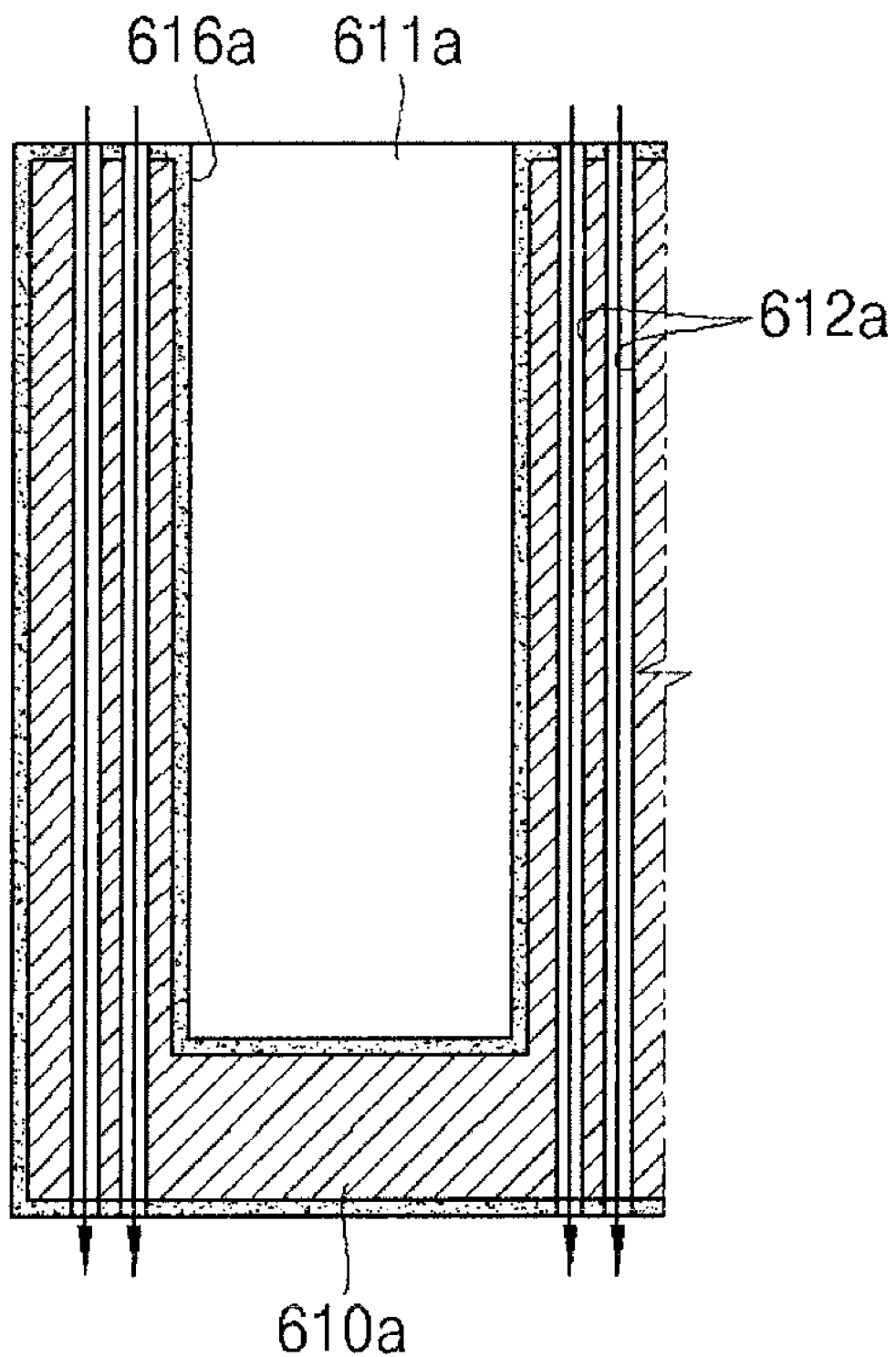
FIGS. 6a, 6b and 6c are schematic cross-sectional views illustrating various shapes of cooling passages and an insulating layer formed in a battery housing according to embodiments of the present invention.
Figure 6B:
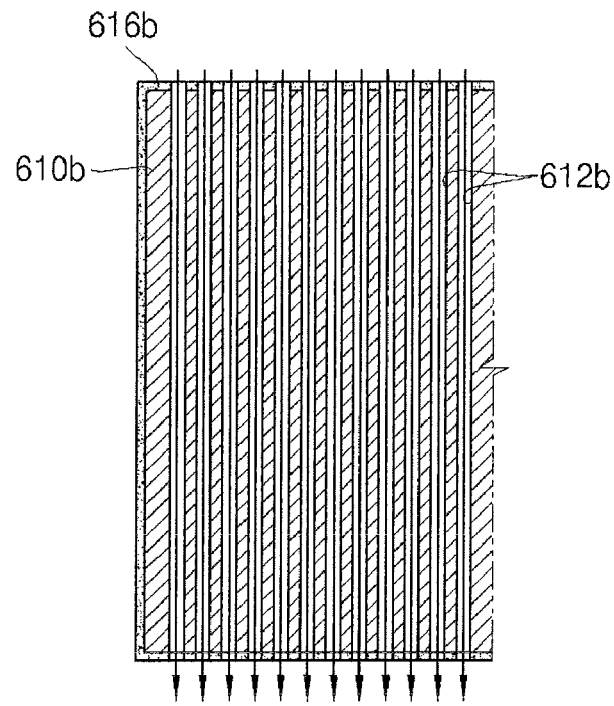
Figure 6C:
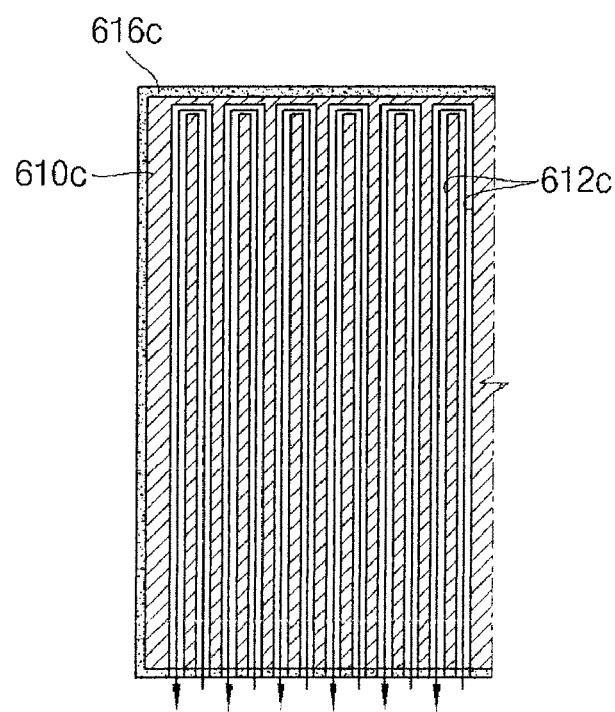

FIGS. 6a, 6b and 6c are schematic cross-sectional views illustrating various shapes of cooling passages and an insulating layer formed in a battery housing 610a according to embodiments of the present invention. In FIGS. 6a through 6c, the arrows indicate the flow directions of the cooling medium.

As illustrated in FIG. 6a, the battery housing 610a has a coupling recess 611a of a set (or predetermined) depth and a plurality of cooling passages 612a formed around the circumference of the coupling recess 611a. The cooling passages 612a are formed so as to penetrate the battery housing 610a. That is, each of the cooling passages 612a has open upper and lower ends.

The battery housing 610a may include an insulating layer 616a of a set (or predetermined) thickness on the outer perimeter or circumstantial surface thereof to define the coupling recess 611a. In one embodiment, the insulating layer 616a has a sufficiently low electrical conductivity and is highly resistant to chemicals. The electrical and chemical properties of the insulating layer 616a permit direct accommodation of an electrolyte in the coupling recess 611a of the battery housing 610a. Further, even when a battery cell 320 is coupled to the coupling recess 611a directly, the insulating layer 616a can prevent (or protect from) unnecessary electrical shorting between the coupling recess 611a of the battery housing 610a and the battery cell 320.

When the battery housing 610a is made of aluminum, the insulating layer 616a may be an anodizing layer. As commonly known in the art, the anodizing layer refers to an aluminum oxide film that is formed on the aluminum surface by oxygen produced from the aluminum material acting as a positive electrode in the electrolyte. The aluminum oxide film has an extremely low electrical conductivity and is highly resistant to chemicals. Non-limiting examples of the insulating layer 616a are polyethylene terephthalate (PET) or ethylene propylene diene M-class (EPDM) coatings.

As illustrated in FIG. 6b, a plurality of cooling passages 612b may be formed so as to penetrate the battery housing 610b. That is, each of the cooling passages 612b has open upper and lower ends. Due to the structure, a cooling medium may flow upwardly or downwardly along the cooling passages 612b. Additionally, the battery housing 610b may include an outer insulation layer 616b.

As illustrated in FIG. 6c, the battery housing 610c may have cooling passages 612c, each of which has one closed end. For example, the upper ends of the cooling passages 612c may be closed and the lower ends thereof may be opened. The two adjacent cooling passages 612c may be connected to each other in the upper region thereof to form a substantially "U" shape as a whole. With this configuration, a cooling medium flows along the cooling passages 612c in a "U" shape to cool the battery housing 610c. Additionally, the battery housing 610c may include an outer insulation layer 616c.

Alternatively, the cooling passages 612c may be formed in the horizontal direction instead of the vertical direction or may be formed in both horizontal and vertical directions. There is no restriction on the direction and shape of the cooling passages 112.

Figure 7:
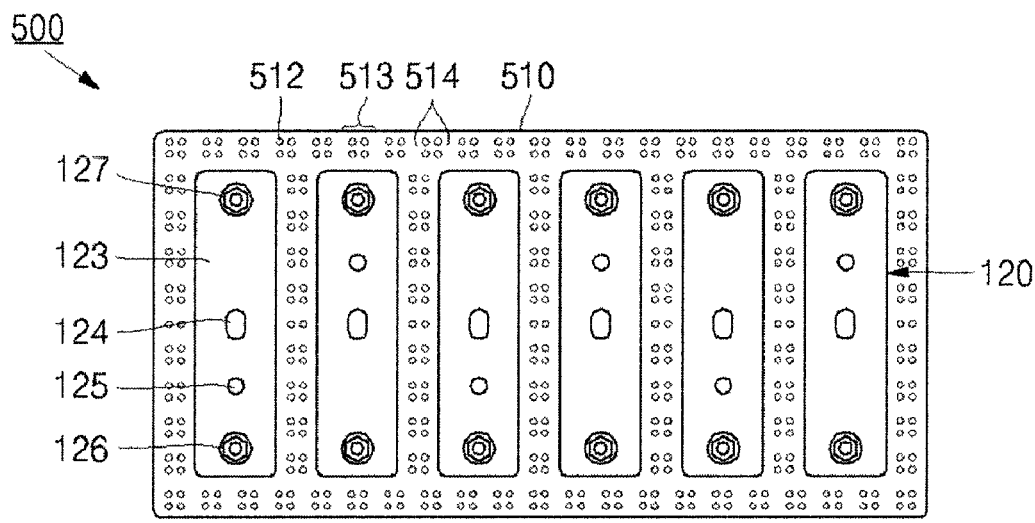
FIG. 7 is a schematic plan view illustrating a battery pack according to yet another embodiment of the present invention.
Figure 8:
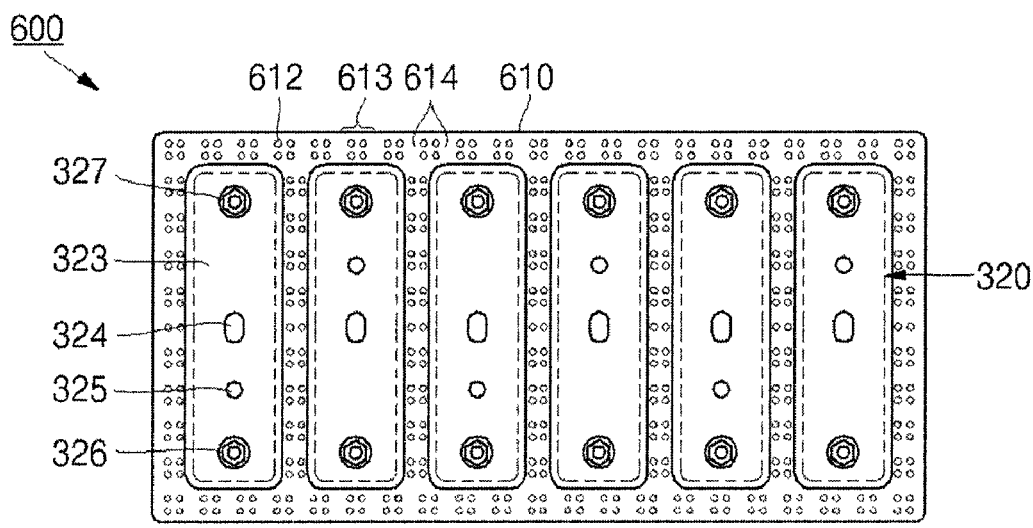
FIG. 8 is a schematic plan view illustrating a battery pack according to still another embodiment of the present invention.

FIGS. 7 and 8 are schematic plan views illustrating battery packs 500 and 600, respectively, according to embodiments of the present invention. The battery pack 500 of FIG. 7 is structurally similar to the battery pack 100 of FIGS. 1a through 1d. The battery pack 600 of FIG. 8 is structurally similar to the battery pack 300 of FIGS. 3a through 3c. Differences between the battery packs will be explained hereinafter.

As illustrated in FIGS. 7 and 8, the battery packs 500 and 600 include battery housings 510 and 610 having cooling passages 512 and 612, respectively. The cooling passages 512 and 612 are grouped at a first pitch. Although each of the groups 513 and 613 is composed of four cooling passages 512 and 612, there is no restriction on the number of the cooling passages 512 and 612 necessary to form each of the groups 513 and 613. The groups 513 and 613 may be arranged at a second pitch greater than the first pitch. Such an arrangement allows for the formation of relatively wide regions 514 or 614 between the adjacent groups 513 and 613. In these embodiments, the wide regions 514 or 614 are formed as reinforcing regions between the groups 513 and 613 of the cooling passages 512 and 612 to further stiffen the battery housing 510 or 610.

Therefore, the strength of the battery housing 510 and 610 of the battery pack 500 or 600 can be further improved without any additional parts or any increase in the thickness of the battery housing 510 and 610 to efficiently prevent battery cells 120 or 320 from swelling arising from an increase in internal pressure during charging or discharging of the battery pack 500 or 600.

Figure 9:
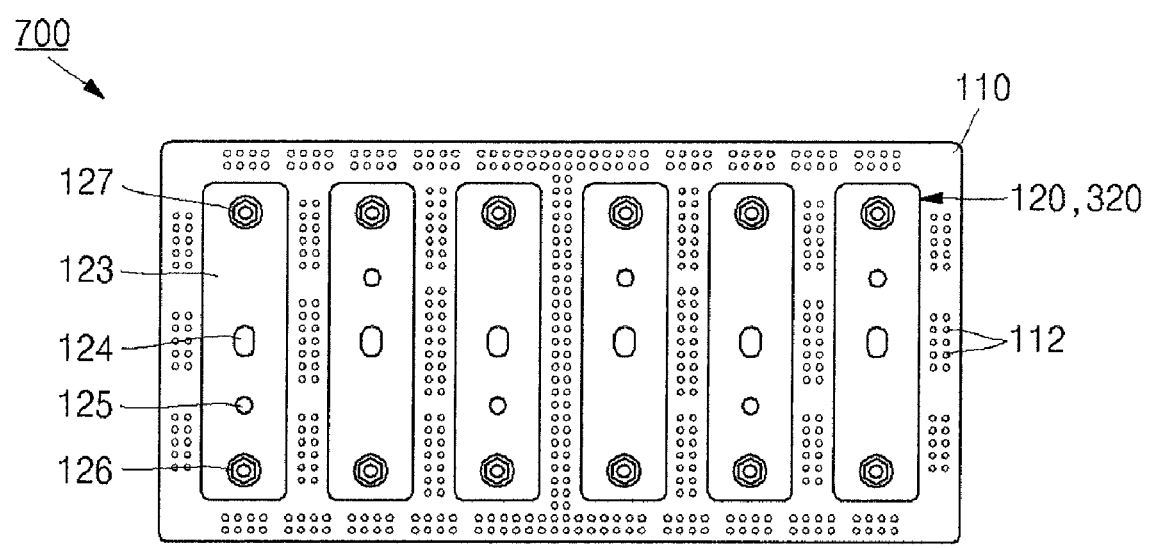
FIG. 9 is a schematic plan view illustrating a battery pack according to still another embodiment of the present invention.

FIG. 9 is a schematic plan view illustrating a battery pack according to still another embodiment of the present invention.

As illustrated in FIG. 9, the battery packs 700 includes a battery housing 110 and battery cells 120 or 320. The battery cells 120 or 320 are the same (or substantially the same) as those described in the previous embodiment. Hereinafter, the battery housing 110 will be primarily explained.

The number of cooling passages 112 is different between the central region and peripheral region of the battery housing 110. For example, the number of cooling passages 112 is relatively large at the central region of the battery housing 110 while the number of cooling passages 112 is relatively small at the peripheral region of the battery housing 110. For another example, the pitch of cooling passages 112 is relatively small at the central region of the battery housing 110 while the pitch of cooling passages 112 is relatively large at the peripheral region of the battery housing 110.

In this embodiment, the temperatures of all battery cells 120 or 320 stacked in a horizontal direction of the battery housing 110 can be maintained at substantially the same level during charge or discharge. As a result, the charge and discharge capacities of the battery cells 120 or 320 are kept relatively constant, leading to an improvement in the electrical performance of the battery pack 700.

As is apparent from the above description, a plurality of cooling passages formed in the battery housing of an embodiment of the present invention can improve the strength of the battery housing even without any additional parts or any increase in thickness to prevent battery cells from swelling arising from an increase in internal pressure during charging/discharging of the battery pack.

In addition, a plurality of cooling passages formed in the battery housing improves the cooling efficiency of the battery pack even without the necessity for any additional cooling members, so that heat generated during charging or discharging of the battery pack can be released rapidly outside to reduce or minimize the degradation of the battery pack.

Furthermore, a heat-screening member capable of selectively opening or closing a plurality of cooling passages formed in the battery housing is disposed on the battery housing to control the cooling efficiencies of different regions of the battery pack, so that the temperatures of all battery cells in the battery pack can be maintained at substantially the same level, achieving optimum battery performance.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a housing having a plurality of inner side walls and a plurality of inner bottom walls defining a plurality of coupling recesses, the inner side walls being integrally provided with the inner bottom walls, the housing further having a peripheral portion around the coupling recesses, and a plurality of cooling passages extending in at least one direction within the peripheral portion;
   a plurality of battery cells housed in the coupling recesses; and
   a heat screen on the housing, the heat screen having a substantially planar surface covering a first array of the plurality of cooling passages, a plurality of first openings each exposing a corresponding one of the coupling recesses, and a plurality of second openings each exposing a second array of the plurality of cooling passages,
   wherein each of the first openings is independently surrounded by corresponding ones of the second openings.

2. The battery pack of claim 1, the housing further having at least one outer side wall and a bottom surface,
   wherein the inner side walls and the at least one outer side wall define the peripheral portion.

3. The battery pack of claim 2, wherein the housing further has a top surface and wherein the at least one direction is a direction normal to the top surface and to the bottom surface.

4. The battery pack of claim 2, wherein the housing further has a top surface and wherein the plurality of cooling passages extend from the top surface to the bottom surface.

5. The battery pack of claim 1, further comprising an insulating layer on the inner side walls and the inner bottom walls of the battery housing.

6. The battery pack of claim 1, wherein each of the battery cells is surrounded by the inner side walls integrally provided with the inner bottom walls.

7. A battery pack comprising:
   a battery assembly comprising:
      an electrode assembly;
      a current collector plate electrically coupled to the electrode assembly; and
      a cap plate on the electrode assembly;
   a housing having a plurality of inner side walls and a plurality of inner bottom walls defining a plurality of coupling recesses, the inner side walls being integrally provided with the inner bottom walls, and at least one of the coupling recesses housing the battery assembly and an electrolyte, a peripheral portion around the coupling recesses, and a plurality of cooling passages extending in at least one direction within the peripheral portion; and
   a heat screen on the housing, the heat screen having a substantially planar surface covering a first array of the plurality of cooling passages, a plurality of first openings each exposing a corresponding one of the coupling recesses, and a plurality of second openings each exposing a second array of the plurality of cooling passages,
   wherein each of the first openings is independently surrounded by corresponding ones of the second openings.

8. The battery pack of claim 7, wherein an area of the cap plate is not less than an area of an opening of at least one of the coupling recesses.

9. The battery pack of claim 7, wherein the cap plate is welded to the housing.

10. The battery pack of claim 7, wherein the cap plate is substantially flush with the heat screen.

11. The battery pack of claim 7, further comprising an insulating layer on the inner side walls and the inner bottom walls of the housing.

12. The battery pack of claim 7, wherein the housing comprises aluminum, copper, iron, stainless steel, a ceramic or a polymer.

13. The battery pack of claim 7, wherein the plurality of cooling passages are evenly spaced from each other.

14. The battery pack of claim 7, the housing further having at least one outer side wall and a bottom surface,
   wherein the inner side walls and the at least one outer side wall define the peripheral portion.

15. A battery pack comprising:
   a plurality of battery assemblies, each of the battery assemblies comprising:
      an electrode assembly;
      a current collector plate electrically coupled to the electrode assembly; and
      a cap plate on the electrode assembly;
   a plurality of coupling recesses, each of the plurality of coupling recesses housing a corresponding one of the plurality of battery assemblies and an electrolyte;
   a battery housing having a plurality of inner side walls and a plurality of inner bottom walls defining the coupling recesses, the inner side walls being integrally provided with the inner bottom walls, and having a plurality of cooling passages extending in at least one direction within a peripheral portion of the battery housing, the peripheral portion being around each of coupling recesses; and
   a heat screen, wherein the peripheral portion of the battery housing comprises a first peripheral portion and a second peripheral portion, and wherein the heat screen has a plurality of openings exposing a larger number of the plurality of cooling passages in the first peripheral portion than in the second peripheral portion, wherein each of the coupling recesses is independently surrounded by corresponding ones of the openings.

16. The battery pack of claim 15, further comprising an insulating layer on the inner side walls and the inner bottom walls of the battery housing.

17. The battery pack of claim 15, the battery housing further having at least one outer side wall and a bottom surface,
   wherein the inner side walls and the at least one outer side wall define the peripheral portion.

* * * * *